United States Patent [19]

Hirschfeld

[11] Patent Number: 4,464,572
[45] Date of Patent: Aug. 7, 1984

[54] INFRARED PHOTOEMITTING DIODE HAVING REDUCED WORK FUNCTION

[75] Inventor: Tomas B. Hirschfeld, Livermore, Calif.

[73] Assignee: The United States of America as represented by the United States Department of Energy, Washington, D.C.

[21] Appl. No.: 375,518

[22] Filed: May 6, 1982

[51] Int. Cl.³ .............................................. G01J 1/00
[52] U.S. Cl. ................................................. 250/338
[58] Field of Search ...................... 250/338, 213 R; 136/254; 313/358, 523

[56] References Cited

U.S. PATENT DOCUMENTS

| | | |
|---|---|---|
| 3,030,537 | 4/1962 | Chubb . |
| 3,408,521 | 10/1968 | Dore et al. . |
| 3,478,213 | 11/1969 | Simon et al. ................. 250/213 VT |
| 3,577,631 | 5/1971 | Bylander et al. . |
| 3,740,690 | 6/1973 | Scharnhorst . |
| 3,900,945 | 9/1975 | Kay et al. . |
| 3,906,283 | 9/1975 | Bard et al. . |
| 3,963,925 | 6/1976 | Breazeale ............................ 250/338 |
| 4,002,902 | 1/1977 | Donjon et al. ...................... 250/338 |
| 4,024,560 | 5/1977 | Miller et al. ........................ 250/338 |
| 4,036,645 | 7/1977 | Pinder et al. . |
| 4,039,116 | 8/1977 | Chaffin . |
| 4,072,864 | 2/1978 | von Gutfeld ....................... 250/338 |
| 4,110,616 | 8/1978 | Porter et al. ....................... 250/338 |
| 4,142,198 | 2/1979 | Finnila et al. . |

OTHER PUBLICATIONS

Hirschfeld, "Improvements in Photomultipliers with Total Internal Reflection Sensitivity Enhancement", Applied Optics, 7(3), Mar. 1968, pp. 443–449.

*Primary Examiner*—Alfred E. Smith
*Assistant Examiner*—Carolyn E. Fields
*Attorney, Agent, or Firm*—Harold M. Dixon; Roger S. Gaither; Michael F. Esposito

[57] ABSTRACT

In electro-optical detectors which include as elements a photoemitting photocathode and anode, a photoemitting diode is fabricated which lowers the diode's work function, thus reducing the cooling requirement typically needed for this type of device. The work function is reduced by sandwiching between the photocathode and anode a liquid medium of the formula $NR_3$ and having an electron affinity for the electrons of the photocathode, which liquid medium permits free electrons leaving the photocathode to remain as stable solvated species in the liquid medium. Thus, highly light-absorbent, and therefore thin, metallic layers can be used for detection, thereby reducing dark current at a given temperature, with a consequent reduction in cooling requirements at constant detector performance.

14 Claims, 3 Drawing Figures

INFRARED PHOTOEMITTING DIODE HAVING REDUCED WORK FUNCTION

The Government of the United States of America has rights in this invention pursuant to Department of Energy Contract W-7405-ENG-48 between the U.S. Department of Energy and the University of California for the operation of Lawrence Livermore Laboratory.

FIELD OF THE INVENTION

This invention relates generally to electro-optical detectors, and more particularly to electro-optical detectors which are capable of detecting radiation in the far infrared (8–14 micron) wavelength region of the electromagnetic spectrum.

BACKGROUND OF THE INVENTION

A typical electro-optical detector consists of a photoemitting diode with a photocathode and anode aligned parallel to one another, separated by a gap, and sealed inside a closed chamber. The photoemitting diode is aligned to face the source of electromagnetic radiation to be measured. The electromagnetic radiation impacts the photocathode, and imparts enough energy to it to dislodge electrons from the inside surface of the photocathode which faces the anode. From an external voltage source, a voltage difference is applied across the photocathode and anode, resulting in migration of the freed electrons across the gap from the photocarthode to the anode. Upon application of an external voltage potential across the electrodes, the photoelectrons move from the photocathode across the gap to the anode, thus giving rise to an electric current through photoconductivity. By suitable measuring techniques the photoelectric current is measured, thus providing desired information about the source of the electromagnetic radiation.

Photoconductive detectors and photoemissive detectors are two typical electro-optical detectors now in use. The photoconductive detector operates in the visible light spectrum; it does not operate in the infrared (IR) spectrum because IR radiation does not have sufficient photon energy to induce the photosensitive surface to emit electrons. In the photoconductive detector, the same material absorbs the light, uses its energy to produce electrons by internal ionization, and conducts a photo current by moving these photoelectrons by application of a voltage difference across the detector. The photoconductive material (that is, the material through which the photoelectrons travel from the photocathode to the anode, thus establishing the photoelectric current) must be almost devoid of electrons at the beginning of its operation, in order not to overload the light-induced signal with a large "dark" current produced by pre-existing electrons within the medium. "Dark current" as used herein is defined as that current which flows in the absence of light.

In the photoconductive detector, to obtain a photoconductive material which is almost devoid of electrons, semiconductor crystals have been widely used as both the detector material to detect the incident electromagnetic radiation and as the material for conducting the resultant electric current. However, in such a material the dark current is not zero, since the thermal agitation of the semiconductor crystal lattice has energies comparable to infrared photons and thus produces electrons by itself which flow as an electric current. The fluctuation in the dark current is a noise, and to make this noise negligible compared with the ambient infrared emission shot noise that limits an ideal detector of electromagnetic radiation, the detector must by cryogenically cooled. Use of cryogenic cooling systems raise considerable cost, bulk, and logistic problems. This is a disadvantage in that these photodetecting diodes are widely used in airborne and spaceborne systems, where weight and logistics are crucial considerations.

Another type of electro-optical detector, as mentioned above, is the photoemissive detector. In the photoemissive detector, the detection and current functions are separated. The photocathode detects the incident electromagnetic radiation and dislodges electrons from its interior surface into the material sandwiched between the photocathode and the anode; the material functions as the conductor of this photoelectric current. Such a division of labor permits the use of, among other things, photocathodes having higher light-absorption capabilities, and therefore requiring smaller thickness to absorb all of the incident light. This smaller thickness means a smaller photocathode volume for the same light-collecting area. Because of this smaller volume, the photocathode has a smaller amount of internal thermal agitation than the semi-conductor devices (the photoconductive detector device previously mentioned), and therefore has a smaller dark current at the same temperature than would the semi-conductor device, or provides equivalent performance with less cooling when sensitive to the same wavelength. Cryogenic cooling is rarely required with these devices, but they do not function in the infrared spectrum.

"Work function" as used here is defined as the amount of energy required to dislodge and transport a photoelectron from the photocathode surface into the gap between it and the anode. The lower the work function, the lower the lowest energy (or the higher the longest wavelength) that can still be observed by the photoemitting diode as a detector of electromagnetic radiation. It is thus desirable to lower the work function to cover the widest possible range of wavelengths. It has been extremely difficult, if not impossible, to find a photoemitting material whose work function into vacuum is much lower than 1.0 eV, which sets an upper limit of approximately 1.2 microns wavelength on the long wavelength threshold of a photoemissive detector.

OBJECTS AND SUMMARY OF THE INVENTION

Accordingly, a principal object of this invention is to provide a photoemitting diode detector having a lower work function, and thus capable of working in the infrared region of the light spectrum.

Another object is to provide a background-limited infrared detector having decreased cooling requirements, thereby saving in cost, weight, size, and complexity of the cooling system required to cool the detector.

Still another object is to devise a photocathode material in conjunction with the electrically insulating photoelectron transport medium which, when designed together, will reduce the work function of the detector.

Yet another object is to devise photoemissive detectors having reduced dark current.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To satisfy these and other objects, this invention in summary provides a photoemissive diode having reduced work function for sensing infrared radiation. A photocathode, selected from among the Groups I, II and III metals, is aligned for its outside surface to receive infrared radiation; the photocathode's inside surface emits electrons in response to the photon energy absorbed from the infrared radiation. An anode is aligned substantially parallel to and spaced apart from the photocathode. A liquid medium, ammonia or an amine of the formula $NR_3$, is sandwiched between the photocathode and anode, has an affinity for the electrons in the photocathode which is less than the work function of the photocathode, and is capable of accepting and holding the electrons emitted from the photocathode as a stable solvated species. A potential difference is applied across the photocathode and anode so the electrons emitted from the photocathode flow as an electric current from the photocathode through the medium to make contact with the anode. This establishes an electric current with can be measured to provide information about the infrared radiation.

BRIEF DESCRIPTION OF THE DRAWINGS

The accompanying drawings, which are incorporated and form a part of the specification, illustrate an embodiment of the invention and, together with the description, serve to explain the principles of the invention.

DESCRIPTION OF A PREFERRED EMBODIMENT

According to the present invention, it is possible to devise detectors capable of detecting infrared radiation far below the limits of devices now in use. This will serve to lower the work function of photoemissive devices below 1.0 eV and allow them to work in the infrared region above 1.2 microns wavelength. With proper choice of photocathode material, in conjunction with proper choice of the photocathode layer composition, the energy required for photoelectron emission from the photocathode can be adjusted so that electrons can leave the photocathode material and enter the conductive material only after receiving some extra energy from the impacting electromagnetic radiation's photons. Unlike the photocathode, the material of the anode can be constructed from materials used in the prior art, e.g., nickel. The long wavelength threshold of the photoelectric effect thus obtained will depend on the work function at the interface between the photocathode and the conducting material. Up to now, these materials have not been devised in conjunction with the selected photocathode composition.

Figure 1:
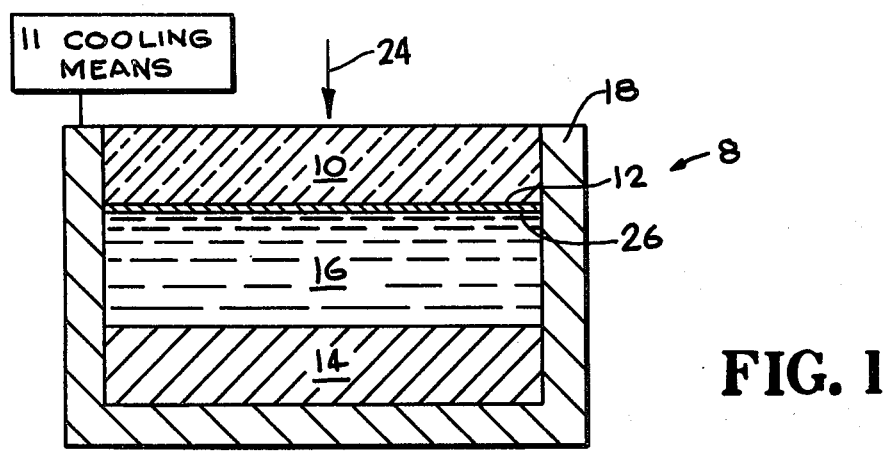
FIG. 1 is a cross-sectional view of a preferred structure of an infrared photoemitting diode.
Figure 2:
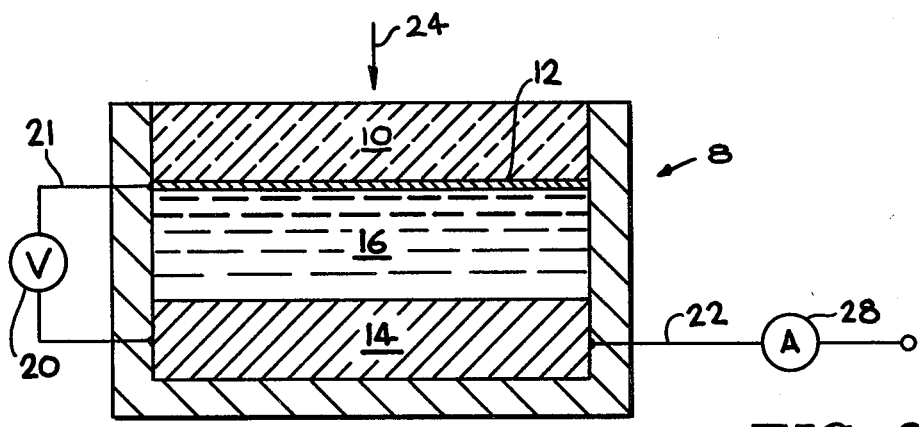
FIG. 2 shows one type of circuit in which the FIG. 1 diode is used.

FIG. 1 illustrates one possible embodiment of the photoemitting diode 8. Window 10 is mounted against photocathode 12 the composition of which is selected in accordance with this invention and which is separated from anode 14 by gap 16. A liquid medium according to the present invention is placed into gap 16, and is in physical contact with the photocathode 12 and anode 14. Walls 18 are attached to and hold apart the photocathode 12 and anode 14 and are sealed so as to contain the liquid medium in gap 16. As shown in FIG. 2, voltage source 20 is electrically connected by leads 21 to photocathode 12 and anode 14. A voltage is then applied so that photocathode 12 has a negative bias with respect to anode 14.

FIG. 2 shows one type of circuit using the present invention shown in FIG. 1. During operation, the infrared radiation 24 to be measured impacts photocathode 12 by passing through window 10. By the well known photoelectric effect, electrons in the photocathode absorb the photon energy from the infrared radiation. The photocathode electrons at the interface 26 between the photocathode and the liquid medium absorb photon energy from the incident infrared radiation sufficient to permit the electrons to dislodge themselves from the photocathode and move into solution in the medium as stable solvated species, i.e., the electrons move into the liquid medium and remain there "suspended" in solution in a manner similar to a soluble solid dissolving and going into solution in a liquid solvent.

Because of the potential difference existing between the photoemitting cathode and the anode, the stable solvated species of negatively charged electrons migrates through the liquid medium toward the positively charged anode 14. These moving electrons establish an electric current, the intensity of which can be measured by a measuring means such as an ammeter 28, which is connected in series to photocathode 12 and anode 14 by leads 22. The measured electric current provides information about the infrared radiation 24 and its source (not shown).

Numerous combinations of materials and dimensions can be used to achieve the result achieved by this invention. Suitable materials for window 10 can be found in the prior art and include barium fluoride, sapphire, glass, calcium fluoride, sodium chloride and quartz; thicknesses used would include a range of from 1–10 mm. It is desirable to fabricate photocathode 12 so it is very thin, with a thickness on the order of 30 to 3,000 Å (Angstroms). Gap 16 could range in width from 10–1,000 microns. The thickness of the anode 14 is not critical. As depicted in the embodiment shown in FIG. 1, wall 18 surrounds the "sandwich" created by window 10, photocathode 12, gap 16 and anode 14. Suitable materials for wall 18 would include either metallic materials or glass materials; however, any material selected for wall 18 will be thermally conductive to permit adequate cooling of the photoemitting diode. Photocathode 12 and anode 14 will be electrically isolated from one another to prevent a short circuit; this could be achieved, for example, by using a dielectric material for wall 18, or using an electrical conductor metallic material for wall 18 and then inserting an electrical insulator (not shown) between photocathode 12 and wall 18, and anode 14 and wall 18. Cooling can be achieved, for example, by immersing the entire photoemitting diode, including the wall 18, in the cooling means. Another approach to cooling would be to provide tubing (not shown) inside wall 18, which tubing would be in fluid communication with the cooling means and capable of carrying a coolant fluid pumped through such tubing.

As mentioned above, it is desirable to choose a medium for gap 16 which serves the same general purpose as the vacuum in the typical photoemitting diode, while at the same time having a strong affinity for electrons. Such a medium, selected in accordance with the present invention, will lower the work function of the photocathode to produce a resultant "effective work function" which is less than the original work function, because the medium material and the photocathode material are selected together to ensure that the specific medium material selected has an affinity for the electrons of the specific photocathode material, and the medium selected is capable of retaining those electrons so emitted as stable solvated species.

Placed into gap 16 is a suitable liquid medium generally of the class represented by the chemical formula $NR_3$, where each R represents hydrogen or a lower alkyl of no more than three carbons. The preferred alkyls are methyl and ethyl. The preferred compounds are those with the greatest number of hydrogens on the nitrogen. Therefore the descending order of preference of compounds embraced by the general formula are $NH_3$, $NH_2R$, $NHR_2$, and $NR_3$. Illustrative compounds of the mono-, di-, and trialkyl amines represented by the latter three formulas, respectively, are methylamine, ethyl amine, propyl amine, dimethyl amine, diethyl amine, trimethylamine, methyl ethyl amine, and triethyl amine and methyl ethyl propylamine. Mixtures of the compounds can be used but in most cases ammonia (i.e., $NH_3$) alone will be found to be the most preferred medium. Ammonia and many of the named amines at normal conditions are gases; accordingly, those materials must be used in a pressurized container or in combination with solutes that elevate the boiling points above ambient temperatures. These solutes are highly soluble ionic salts such as $NH_4NO_3$, LiI and the like.

These liquid media are electrical insulators within which a free electron can exist as a stable solvated species capable of conducting electricity in the presence of an applied electric field. Liquid ammonia is known to dissolve and thus ionize virtually all alkali metals (sodium, potassium, lithium, cesium, and rubidium) as blue solutions, with the metal ion and solvated electron existing as separate entities.

Liquid ammonia's affinity for electrons is about 1.5 eV, which is large enough to ionize an alkaline metal without any added photon energy being imparted by the incident electromagnetic radiation. However, in moving to the use of higher work function metals of Groups II (beryllium, magnesium, calcium, strontium, barium, and radium) and III (aluminum, gallium, indium, and thallium) of the periodic table of the elements, the metals ionize less and less readily, and finally do not ionize at all. By proper choice of the metal or alloy for the photocathode to match it with a proper medium, a situation can be created wherein the metal photocathode material just barely does not dissolve and ionize; the photoelectrons are loosely bound and easily dislodged by a photon. In such a system, the influence of the medium's electron affinity (the medium preferably being ammonia) will be felt by the photoelectrons at the surface layer of the inside of a thin photocathode, preferably less than 1,000 Angstroms thick. These photoelectrons interact with the ammonia molecules on the one side and with the metal lattice on the other. The effect of the ammonia's presence will thus be to reduce the amount of energy required to transport an electron from the interior of the photocathode metal to the interior of the ammonia solution; that is, the ammonia reduces the photocathode work function for electron photoemission.

With proper choice of the photocathode layer composition, the energy required for electron emission from the photocathode into the ammonia can be adjusted so that electrons can leave the metal or alloy only after getting some extra energy from a photon. The long wavlength threshold of the photoelectric effect thus obtained will depend on the effective work function at the metal-ammonia interface. The alkaline metals in contact with liquid ammonia have spontaneous ionization, implying an effective work function less than zero. Many other materials (aluminum, for example) do not interact with liquid ammonia. Therefore, it is possible to obtain any desired small work function by using metals or alloys of intermediate properties. The use of more complex photocathode layer mixtures is also possible if they are compatible with ammonia or the amines.

Rather than adjusting the composition of the metal layer of the photocathode, it is also possible to choose the composition of a liquid amine mixture and keep the metal layer the same. This technique exploits the varying electron affinities of the different amines. One such possible change would be the addition of salts such as lithium iodide to the ammonia, which would adjust both electron affinities and solvent power (the latter by salting out effects). An added benefit is that solutions of salts such as ammonium nitrate in liquid ammonia show considerable desirable elevations in boiling point (up to a 106° C. boiling point for a saturated lithium iodideammonia solution), thus allowing easier construction of the detectors because cooling or pressurization requirements are reduced. Freezing point suppression permits operation of the diode at lower temperatures because the medium remains liquid in the presence of lower temperatures; this would also reduce dark current.

Dark current in a photoemitting diode appears as ions moving from the photocathode to the anode. Because of their size and mass, the ions move at a speed which is much slower than the speed of the electrons moving from the photocathode to the anode. If the voltage source attached to the photocathode and anode provides a potential difference with a direct current voltage, then both electrons and ions will complete the trip across the gap, although at different speeds. However, if the voltage source supplies an alternating current, the period of which is short compared with the average time required for an ion to move from the photocathode to the anode, the dark current will be reduced as the alternating current switches poles before the ion has a chance to traverse the gap. This approach will keep most ions oscillating back and forth between the changing poles of the electrodes so that the ions remain in the gap, reducing the dark current. The electrons, however, move fast enough to complete the distance between the photocathode and anode before the electrodes change poles. This provides a desirable larger difference between the ion current dark noise and the electron current signal than if a direct current source of voltage were used, and also yields a faster detector response time.

Dark current can be expressed as the number of ion charges per second flowing from the photocathode through the medium to the anode; the noise is numerically equivalent to the square root of the number of these charges. Responsiveness of the detector is numerically defined as the distance traveled by the electrons divided by the electron mobility in the medium between the photocathode and the anode.

The maximum potential which can be applied across the photocathode and the anode is on the order of 0.7–1.0 eV. Higher potential differences will allow electrolytic conduction through the liquid ammonia, giving rise to quite considerable undesirable spurious dark currents. Therefore, voltage must be kept low; however, a restriction to these low voltages implies low ion velocities and slow detector response speeds. The photocathode of this invention is already much slower than that of a typical vacuum photodiode, since electrons move much more slowly in liquid ammonia than in a vacuum. Thinner layers of ammonia will increase the speed of response of the detector, but also will increase dark currents because of the limited resistivity of liquid ammonia. Thus faster response times must be traded off against higher noise levels of the dark current.

Response time, as used here, is defined as the time delay between the onset of the signal (that is, the time of impact of the electromagnetic radiation with the photocathode) and the onset of the response (that is, photoelectric ejection of electrons from the inside surface of the photocathode into and through the ammonia, and impacting the anode). In many applications, it is the smaller spread time of the detection response that is of interest, but this is proportional to the above delay.

As an example of the order of magnitude of the necessary compromises, a 10-micron thick liquid ammonia layer will have about a 6-microsecond response time and a $10^{-14}$W conduction contribution to the Noise Equivalent Power (NEP) of a detector with 1 mm$^2$ photocathode surface area which is facing and in contact with the liquid ammonia.

In the photoemissive detector of the preferred embodiment, it is possible to use a photocathode of arbitrarily high absorptivity, since extra energy from the photons of the incident electromagnetic radiation is necessary for electron emission from the surface of the photocathode into the ammonia medium. Such a metallic photocathode has 2-3 orders of magnitude higher light absorption capabilities than the semiconductors normally used in photoconductive detectors, and allows use of proportionately smaller thicknesses to absorb all of the incident light. This much smaller thickness means a much smaller volume occupied by the detector, a much smaller amount of thermal agitation within the photocathode, and therefore a much smaller dark current at the same temperature. Alternatively, the same dark current and background-limited performance can be realized at a much higher and more convenient operating temperature.

Further benefits of photoemitting cathode detectors accrue from their high absorption across the electromagnetic spectrum, giving flatter spectral response curves. Also, there is the intrinsic advantage of photoemission that only the generation, but not the destruction, of the photoelectron current-carriers is random, thereby cutting the dark current noise in half. Additionally, the ability to position the long wavelength threshold of the detector at will by using appropriate alloy photocathodes is useful. In many cases where NEP is limited by background noise, dark noise reductions would appear to be useless. However, background noise and dark noise reductions can be traded off for higher operating temperatures at constant noise, which again has the considerable technological advantage of decreasing the cooling requirements.

The long wavelength threshold of such a detector cannot be placed entirely at will, since liquid ammonia loses its favorable properties as an electron transport medium at its freezing point of −77° C. Therefore, operating temperatures cannot become very low (even using lithium iodide as a freezing point depressant). The minimum final temperature is thus fixed, as is the reduction in cooling requirements. The effectiveness of classical photoemitting devices ends at wavelengths of approximately 1.1 microns. For certain applications, it is desirable to have a detector which will work in three wavelength ranges, which are: (1) 1.8 to 2.2 microns, (2) 3.0 to 5.0 microns, and (3) 8.0 to 14.0 microns. Atmospheric opacity reduces the interest in using photodetection devices in the wavelength regions between these ranges and above 1.1 microns. It is convenient to refer to these wavelength ranges as atmospheric "windows". In non-atmospheric applications such as in the laboratory, it is possilbe to use detectors in the entire infrared wavelength region. The invention described herein can detect wavelengths to the 8-14 micron atmospheric "window" range.

Figure 3:
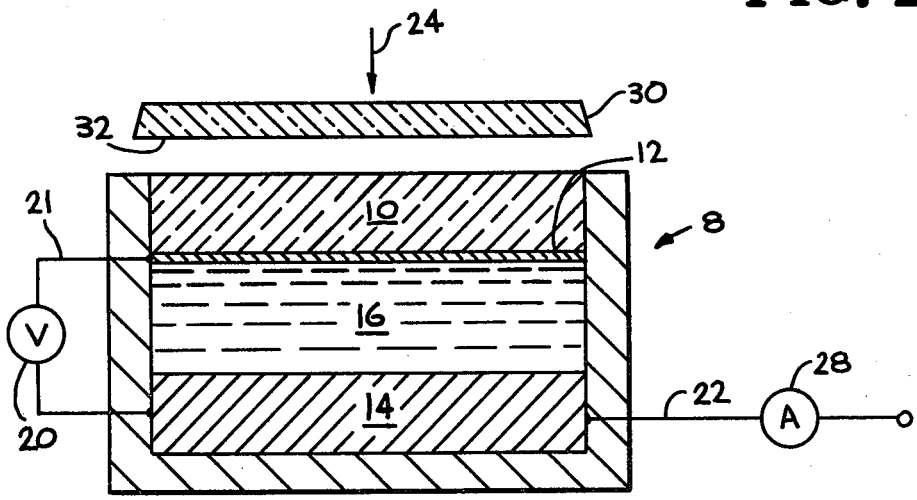
FIG. 3 shows the addition of a lense to the diode of FIG. 1, which enhances the infrared radiation received.

Regarding the use of a metal or metallic material as the photocathode, the low escape depth for low energy photoelectrons in metals may require the use of optical techniques for absorption enhancement, such as total internal reflection or interference, to further limit the photocathode thickness. The result of this is to increase the effective light collecting area. The photocathode can be comprised of a layer of a metal attached to a low index window material to create interference patterns in the window and photocathode. For example, in FIG. 1, window 10 can be surrounded with a vertical mirror surface (not shown), making the totally reflected incoming infrared radiation beam double back and be reflected a few more times inside window 10. Another possible approach is shown in FIG. 3, wherein a window means of high index material such as lense 30, having for example a truncated pyramid shape, is placed in front of window 10. In FIG. 3 the base 32 of the truncated pyramid lense 30 faces window 10. The incident radiation will be condensed by lense 30 so the incident electromagnetic radiation is intensified prior to entering window 10. This amplification will enhance electron emission from the photocathode and permit the use of very thin photocathodes, on the order of 1,000 A thick. The use of a low index window material for window 10 will create useful interference patterns in window 10 and enhance absorption of infrared radiation. If the lense 30 placed in front of window 10 is composed of a high index material, it can be aligned at a preselected angle which will enhance total internal reflection of the photocathode, thus enhancing its absorption characteristics. For a more thorough discussion of light enhancement, see the article entitled "Improvements in Photomultipliers with Total Internal Reflection Sensitivity Enhancement", by T. Hirschfeld, appearing in *Applied Optics*, Vol. 7, No. 3, March 1968.

As discussed above, this invention in summary provides a photoemitting diode for sensing infrared radiation, which comprises: a photocathode defining a first surface aligned to receive infrared radiation, and a second surface containing electrons which are emitted in response to the received infrared radiation; an anode positioned substantially parallel and spaced apart from the photocathode; a liquid medium disposed between and contacting the photocathode and anode, the medium having an affinity for the electrons in the photocathode, the magnitude of the affinity being less than the work function of the photocathode, and being capable of accepting and holding the emitted electrons as stable solvated species; means for generating and applying a voltage potential difference across the photocathode and anode so that the emitted electrons flow as an electric current from the photocathode through the medium to the anode; and means for detecting, measuring and analyzing the electric current to obtain information about the infrared radiation.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A photoemitting diode for sensing infrared radiation, which comprises:
 a photocathode defining a first surface aligned to receive infrared radiation, and a second surface containing electrons which are emitted in response to the received infrared radiation, said photocathode being constructed of at least one metal from Groups I, II, and III of the periodic table;
 an anode positioned substantially parallel to and spaced apart from said photocathode;
 a liquid medium disposed between and contacting said photocathode and anode, said medium having the formula $NR_3$ wherein R is independently selected from the group consisting of H and alkyl radicals of 1 to 3 carbon atoms and said medium having an affinity for the electrons in said photocathode, the magnitude of the affinity being less than the work function of said photocathode, and being capable of accepting and holding said emitted electrons as stable solvated species;
 means for generating and applying a voltage potential difference between said photocathode and anode whereby emitted electrons flow as an electric current from said photocathode through said medium to said anode; and
 means for detecting, measuring and analyzing said electric current to determine the quantity of said infrared radiation.

2. The photoemitting diode of claim 1, wherein said photocathode has a thickness of up to about 1,000 Angstroms.

3. The photoemitting diode of claim 1, wherein said photocathode is comprised of a material containing at least one alkali or alkaline earth metal.

4. The photoemitting diode of claim 1, wherein at least one R is hydrogen.

5. The photoemitting diode of claim 1, wherein said medium is selected from $NH_3$, $NH(CH_3)_2$, $NHC_2H_5CH_3$, and $NH(C_2H_5)_2$.

6. The photoemitting diode of claim 1, wherein said medium is $NH_3$.

7. The photoemitting diode of claim 1, wherein cooling means is connected in heat-conducting relation with said diode.

8. The photoemitting diode of claim 1, wherein one or more highly soluble salt selected from $NH_4NO_3$ or LiI is added to said medium.

9. The medium of claim 8, wherein said added salt is lithium iodide.

10. The photoemitting diode of claim 1, wherein at least one means for amplifying the incident infrared radiation is disposed in front of said photocathode to enhance electron emission from said photocathode.

11. The photoemitting diode of claim 1, wherein said diode is surrounded by and contained in a sealed pressurized container.

12. The photoemitting diode of claim 1, wherein said voltage source generates an alternating current.

13. The photoemitting diode of claim 1, wherein said photocathode is comprised of a layer of a metal attached to a low index window material, said low index material forming interference patterns in said window to thereby enhance absorption of incident infrared radiation and enhance electron emission from said photocathode to said anode.

14. The photoemitting diode of claim 1, further including a lense means of high index material disposed on top of said photocathode, aligned at an angle selected to allow enhanced internal reflection in said photocathode.

* * * * *